United States Patent
Yamashita et al.

(10) Patent No.: US 6,197,885 B1
(45) Date of Patent: *Mar. 6, 2001

(54) VIBRATION DAMPENING AND/OR ISOLATION VULCANIZATE HAVING HIGH TEMPERATURE STABILITY

(75) Inventors: Shinichiro Yamashita, Kawasaki (JP); Kenneth Odell McElrath, Jr., Houston, TX (US)

(73) Assignee: Exxon Chemical Patents, Inc., Baytown, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 38 days.

This patent is subject to a terminal disclaimer.

(21) Appl. No.: 09/205,906

(22) Filed: Dec. 4, 1998

Related U.S. Application Data

(62) Division of application No. 08/684,116, filed on Jul. 19, 1996, now Pat. No. 5,904,220.
(60) Provisional application No. 60/002,365, filed on Aug. 15, 1995.

(51) Int. Cl.[7] ............... B60K 1/00; C08L 9/02; C08L 47/00; F16M 1/00
(52) U.S. Cl. ............ 525/233; 180/300; 248/638
(58) Field of Search ............ 525/233; 180/300; 248/638

(56) References Cited

U.S. PATENT DOCUMENTS

| | | | |
|---|---|---|---|
| 4,324,710 | 4/1982 | Davis et al. | 524/76 |
| 4,391,942 | 7/1983 | Nakauchi et al. | 524/526 |
| 4,492,366 | 1/1985 | Ozawa et al. | 267/140.1 |
| 5,052,510 | 10/1991 | Gossman | 180/300 |
| 5,162,445 | 11/1992 | Powers et al. | 525/333.4 |
| 5,397,837 | 3/1995 | Arjunan | 525/72 |
| 5,656,694 | 8/1997 | Fréchet et al. | 525/195 |
| 5,904,220 * | 5/1999 | Shinichiro et al. | 180/300 |

FOREIGN PATENT DOCUMENTS

| | | |
|---|---|---|
| 2243663 | 11/1991 | (GB) . |
| 41 13 521 | 11/1991 | (DE) . |
| WO 91/19761 | 12/1991 | (WO) . |
| WO 94/01295 | 1/1994 | (WO) . |

* cited by examiner

*Primary Examiner*—Nathan M. Nutter
(74) *Attorney, Agent, or Firm*—Myron B. Kurtzman; Brent M. Peebles

(57) ABSTRACT

Vulcanized rubber parts suitable to dampen vibrations generated by mechanical devices are disclosed. The parts are based on a cured composition comprising one or a mixture of a diolefin polymers, e.g., natural rubber, a halogenated copolymer of a $C_4$ to $C_7$ isomonoolefin, e.g., isobutylene, and a para-alkylstyrene, filler and a curing system. The vulcanized parts exhibit improved aging and high temperature resistance and reduced deterioration of dynamic properties after long term exposure to high temperatures.

13 Claims, No Drawings

VIBRATION DAMPENING AND/OR ISOLATION VULCANIZATE HAVING HIGH TEMPERATURE STABILITY

CROSS REFERENCE TO RELATED APPLICATION

The present application, 09/205,906 is a divisional application of U.S. Ser. No. 08/684,116, filed Jul. 19, 1996, now issued U.S. Pat. No. 5,904,220, issued May 18, 1999, which claims priority from provisional application No. 60/002,365, filed Aug. 15, 1995.

TECHNICAL FIELD

The present invention relates to vulcanized rubber parts useful to dampen and/or isolate vibrations generated by mechanical devices.

BACKGROUND

Machines such as automobile, truck or jet engines, compressors and industrial air conditioners, automotive exhaust systems and like dynamic devices generate significant vibration during operation. This vibration will be transmitted directly to support structures with which the dynamic devices is mounted or associated, e.g., an automobile or aircraft frame, a compressor frame, or a floor or rooftop. In order to minimize transfer of vibration from the operating dynamic device to the associated support structure, i.e., isolate the vibrations, it is common to interpose vibration damping and/or isolation means between the dynamic device and the associated support structure. Examples of such vibration damping and/or isolation means would be vibration-absorbing, elastomeric automobile or truck engine mounts placed between the brackets which are used to bolt the engine to the associated auto or truck frame, exhaust hangers, pads interposed between an air conditioner or compressor and a frame or floor and the like.

Vibration damping and/or isolation materials known in the art include vulcanized shapes, e.g., squares, rectangles or cylindrical shapes prepared from vulcanized rubber. These dampening and/or isolation devices can be solid rubber, foamed rubber or solid rubber enclosing a fluid-containing cavity. Suitable rubbers which have heretofore been used in such applications include halogenated and non-halogenated butyl rubber (copolymer of isobutylene with up to 10 wt % isoprene), natural rubber and synthetic elastomeric polymers and copolymers of butadiene.

In addition, EPA 0533746 discloses vibration damping materials based on a vulcanized mixture containing a halogenated copolymer of a $C_4$ to $C_7$ isomonoolefin and para-alkystyrene, carbon black, a plasticizer oil and a curing system.

Although natural rubber is an elastomer of choice in some applications because of its superior dynamic properties, i.e., good tensile, modulus and spring rate (stress/strain) properties, the aging and high temperature resistance of cured parts based on natural rubber vulcanizates are poor, thereby limiting the effective life of such parts. For example, engine mounts associated with modern engines must be able to withstand temperatures as high as 150° C. for periods in the range of 1,000 to 5,000 hours without significant loss of dynamic properties, in order to meet current and anticipated automotive standards.

SUMMARY

The present invention provides shaped rubber parts, either solid, foamed, or fluid filled useful to isolating vibrations and dampening vibrations generated by mechanical devices. More particularly, the invention provides mechanical devices comprising a dynamic means which generates heat and/or vibrations, e.g., an automotive engine, an electric motor, and a static structure which supports said dynamic means, e.g., an automotive frame, and which is connected to said dynamic means, e.g., by bolting together brackets attached to the frame and engine, and having a vulcanized rubber vibration, isolation, and/or damping part interposed between said dynamic means and said static structure at said point of connection, e.g., one or more disc-shaped rubber parts sandwiched between the engine and frame brackets. The improvement provided by the invention comprises the utilization as said rubber part of a shaped, vulcanized composition comprising a mixture of:

1. An elastomeric olefin polymer or copolymer,
2. an elastomeric, halogen-containing copolymer of a $C_4$ to $C_7$ isomonoolefin and a para-alkylstyrene, said halogen-containing copolymer comprising from 10 to 35 wt % of the elastomer content of the mixture;
3. a particulate filler; and
4. a curing system for said composition.

The elastomeric olefin polymer or copolymer can be derived from monoolefins or diolefins. Molded or shaped parts prepared from the vulcanized composition exhibit both excellent isolation and vibration damping properties at high and low temperatures and enhanced heat aging resistance, thereby rendering them particularly suitable for applications involving prolonged exposure to high temperatures.

DESCRIPTION

The halogen-containing elastomer present in the curable composition of this invention is a chlorinated or brominated interpolymer of a $C_4$ to $C_7$ isomonolefin and a para-alkylstyrene.

Halogenated interpolymers based on a $C_4$ to $C_7$ isomonoolefin, such as isobutylene, and a para-alkylstryene, such as para-methylstyrene, are known in the art as evidenced by U.S. Pat. No. 5,162,445, the complete disclosure of which is incorporated herein by reference.

Preferred materials are the halogenation product of a random copolymer of a $C_4$ to $C_7$ isomonoolefin, such as isobutylene, and a para-alkylstyrene comonomer wherein at least some of the alkyl substituent groups present in the styrene monomer units contain halogen. Preferred materials may be characterized as isobutylene interpolymers containing the following monomer units randomly spaced along the polymer chains:

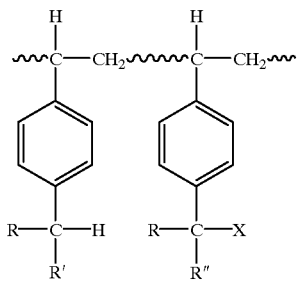

wherein at least about 5% of the comonomer units present in the polymer chain are of the structure of formula 2, R and R' are independently hydrogen or $C_1$ to $C_4$ alkyl, R" is independently hydrogen, $C_1$ to $C_4$ alkyl or X, and X is bromine or chlorine, and wherein the interpolymer is otherwise substantially free of any halogen in the polymer backbone chain.

With reference isobutylene as the isoolefin comonomer, these interpolymers are inclusive of:

1. copolymers consisting of isobutylene and a monomer having the structure of formula 2 wherein R" is hydrogen or $C_1$ to $C_4$ alkyl, eg, copolymers of isobutylene and a monohalo-substituted para-alkylstyrene;
2. terpolymers comprising isobutylene and a mixture of monomers having the structure of formulas 1 and 2 wherein R" is hydrogen or $C_1$ to $C_4$ alkyl, eg, terpolymers of isobutylene, a para-alkylstyrene and a monohalo-substituted para-alkylstyrene;
3. terpolymers comprising isobutylene and a mixture of monomers having the structure of formula 2 wherein, with respect to a major proportion of the formula 2 monomer, R" is hydrogen or $C_1$ to $C_4$ alkyl and, with respect to a minor proportion of said formula 2 monomer, R" is bromine or chlorine, eg, terpolymers of isobutylene, a mono-halo substituted para-alkylstyrene and a di-halo substituted para-alkylstyrene; and
4. tetrapolymers comprising isobutylene and a mixture of monomers having the structure of formulas 1 and 2 wherein, with respect to major proportion of the formula 2 monomer, R" is hydrogen or $C_1$ to $C_4$ alkyl and, with respect to a minor proportion of said formula 2 monomer, R" is bromine or chlorine, eg, tetrapolymers of isobutylene, a para-alkylstyrene, a monohalo-substituted para-alkylstyrene and a dihalo-substituted para-alkylstyrene.

As stated above, these halogenated interpolymers are prepared using a copolymer of a $C_4$ to $C_7$ isoolefin and a para-alkylstyrene as the halogenation substrate. Interpolymers having the composition (a), (b), (c) or (d) above will be produced as a function of the severity of the halogenation reaction. For example, mild halogenation will tend to yield interpolymers of the characteristics of (b), stronger halogenation will yield interpolymers of the characteristics of (a) or (d) and the strongest halogenation will yield terpolymers having the characteristics of (c).

The most preferred elastomers used in the compositions of the present invention are random elastomeric brominated terpolymers comprising isobutylene and para-methylstyrene (PMS) containing from about 0.5 to about 20 wt % PMS, more preferably from about 2 to about 15 wt % PMS, wherein up to about 65% of the PMS monomer units contain a mono-bromomethyl group. These elastomeric copolymers generally exhibit a number average molecular weight in the range of from about 50,000 to about 250,000, more preferably from about 80,000 to about 180,000. From about 5 up to about 65% of the total PMS monomer content of the terpolymer contains a mono-bromomethyl group with essentially no bromination occurring in the polymer backbone or in the aromatic ring. The bromine content of these terpolymers generally ranges from about 0.1 to about 5 mole %.

The major elastomeric component of the composition of the invention comprises a olefin polymer or copolymer. Preferred diolefin polymers are polymers of conjugated dienes such as natural rubber, synthetic polyisoprene, polybutadiene, elastomeric terpolymers of ethylene, propylene and a non-conjugated diene (EPDM rubber) as well as elastomeric copolymers of butadiene with up to about 35 wt % styrene and/or acrylonitrile, as well as mixtures of two or more of these elastomers. The preferred diolefin polymer is natural rubber because cured natural rubber exhibits superior vibration dampening and dynamic physical properties. Preferred monoolefin copolymers are ethylene monoolefin copolymers wherein the monoolefin has from 3 to 16 carbon atoms, preferably 3–8 carbon atoms, most preferably 3 or 4 carbon atoms.

The content of the halogen-containing polymer is such that it comprises from about 10 to 35 wt % of the total elastomer content of the composition, more preferably from about 15 to 30 wt % of the total elastomer content of the composition.

Suitable curing systems include curing agents such as sulfur and mixtures of sulfur with sulfur-containing accelerators such as thiuram sulfides, dithiocarbamates, thioureas, thiazoles, sulfanamides, quanidines and like materials. The curing agent may also comprise a resin cure such as phenolic resins, brominated phenolic resins and the like. The quantity of such curing agents added to the composition will generally range from about 1 to 6 phr, more preferably from about 1.5 to 4 phr.

Preferred curatives comprise a mixture of sulfur and an accelerator such as benzothiazyl disulfide, N-oxydiethylene benzothiazole-2-sulfonamide, 2-mercaptobenzothiazole, alkyl phenol disulfides, tetramethylthiuram disulfide, m-phenylenebismaleimide, N, $N^1$-diarylguanidines, and like known materials.

The sulfur curing system is preferably used as a cocurative in curing systems also containing zinc oxide or an equivalent thereof, e.g., zinc chloride, zinc bromide or ferric chloride, as a cocuring agent. Zinc oxide is normally used in such systems at a level of from about 0.2 to about 7 parts by weight per 100 parts by weight of elastomer. The present invention provides for particularly good low cure reversion where zinc oxide is present at relatively low levels in the range of from about 0.5 to about 3.5 parts by weight per 100 parts by weight of elastomer.

The vulcanizable composition may also contain other conventional additives known in the art, including fillers such as carbon black or silica, stabilizers, antioxidants, plasticizers, processing oils, pigments, flame retardants, and like additives as is known in the art.

Examples of fillers include inorganic fillers such as carbon black, silica, calcium carbonate, talc, clay and metal powder, and organic fillers such as high-styrene resin, coumarone-indene resin, phenolic resin, lignin, modified melamine resins and petroleum resins. The preferred filler is reinforcing grade carbon black present at a level of from about 10 to 65 parts by weight per hundred parts by weight of total elastomer content of the blend, more preferably from about 20 to 60 parts by weight.

Examples of lubricants include petroleum-type lubricants such as oils, paraffins, and liquid paraffins, coal tar-type lubricants such as coal tar and coal tar pitch; fatty oil-type lubricants such as beeswax, carnauba wax and lanolin, fatty acids and fatty acid salts such as licinoleic acid, palmitic acid, barium stearate, calcium stearate and zinc laureate; and synthetic polymeric substances such as petroleum resins.

Suitable plasticizer oils include paraffinic, aromatic or naphthenic petroleum oils as are known in the art. These may be present in the composition at a level of from 0 to about 20% by weight of the composition, more preferably from about 1 to 10% by weight of the composition.

The composition of the present invention may comprise a total mixed elastomer content in an amount ranging from about 40 to 80, preferably from about 55 to about 65 weight percent, the carbon black in an amount ranging from about 10 to about 30, preferably from about 20 to about 25 weight percent; the plasticizer oil in an amount ranging from above 0 to about 20, preferably from about 1 to about 10 weight percent; the total amount of other fillers and additives in an amount ranging from above 0 to about 10, preferably from about 3 to about 5 weight percent; and the curing agent in an amount ranging from about 1 to 5, preferably from about 1 to 2 weight percent, all said percentages being based on the weight of the total composition.

The vulcanizable composition may be prepared and blended using any suitable mixing device such as a two-roll mill, an internal mixer (Brabender Plasticorder), a Banbury Mixer, a kneader or a similar mixing device. Blending temperatures and times may range about 100° C. to 180° C. and from about 1 to 10 minutes respectively. The sequence of mixing, time of mixing and temperatures employed are such that a uniform dispersion of all components of the composition, except the curatives, is first achieved.

A useful mixing procedure utilizes a Banbury mixer in which the elastomeric polymers, the filler and a process oil are added and the composition mixed for the desired time or to a particular temperature to achieve adequate dispersion of the ingredients. Alternatively, the rubber and a portion of the filler (e.g., one-third to two-thirds) is mixed for a short time (e.g., about 1 to 3 minutes) followed by the remainder of the filler and oil. Mixing is continued for about 5 to 10 minutes at high rotor speed during which time the mixed compound reaches a preferred temperature of about 160° C. Following cooling, the compound is mixed with curatives in a second step to disperse the curatives at relatively low temperature, e.g., about 80 to about 120° C. Variations in mixing will be readily apparent to those skilled in the art and the present invention is not limited by the mixing procedure. The mixing is performed to disperse all components of the composition thoroughly and uniformly.

Vulcanization of a molded article, for example a motor mount, may be carried out in heated presses under conditions well known to those skilled in the art. It is preferred that vulcanization be effected at temperatures of about 140 to about 250° C. and for periods of about 2 to about 60 minutes. Curing time will be affected by the thickness of the article and the concentration and type of curing agent as well as the initial halogen content of the halogenated polymer. However, the vulcanization parameters can readily be established with a few experiments utilizing e.g., a laboratory characterization device well known in the art, the Monsanto Oscillating Disc Cure Rheometer (described in detail in American Society for Testing and Materials, Standard ASTM D 2084).

Alternatively, the curable composition can be injection molded to form shaped articles and held in the mold for a sufficient time to form a cured, shaped article.

The composition of the present invention may be used in producing vibration damping and/or isolation parts used to isolate or decrease the effect of vibrations from motor, engines and the like. It is particularly suitable for use in the production of elastomeric mountings for control of vibration, for example automotive body and engine mounts; automotive exhaust hangers; dynamic absorbers (e.g., shock absorbers); bushings; automotive suspension bumpers, and the like. The compositions are especially useful in the assembly of automotive engine mounts which are subjected to high operating temperatures of up to about 150° C. In such an application, molded parts in the shape of discs are interposed between motor and auto frame brackets prior to bolting the brackets together to secure the motor to the frame. For especially high-quality isolation use of hydromounts, i.e., rubber enclosing a fluid, is desirable. The enclosed liquids are generally high boiling. Typically, the liquids are selected from glycols such as ethylene glycol and propylene glycol.

The following examples are illustrative of the invention. The materials used in preparing the various formulations as abbreviated in the Tables were as follows:

| | |
|---|---|
| MDX 90-10 | Random brominated copolymer of isobutylene and paramethylstyrene containing about 7.5% wt of para-methylstyrene, 2.0 wt % bromine (1.2 mole %), 0.07 calcium (as calcium stearate), 0.04 wt % phenolic antioxidant and having a Mooney viscosity ML (1 + 8) at 125° to 45 + 5. |
| SMR-5 | Natural rubber (standard Malaysian rubber, Grade #5) |
| SUNPAR ® 2280 | Paraffinic processing oil. |
| Aroma 790 | Aromatic processing oil. |
| CBS | N-cyclohexyl-2-benzothiazylsufenamide |
| Vultac #5 | Alkyl phenol disuffide (Pennewalt Corp.) |

EXAMPLES 1–3

A series of formulations described in Table 1 were prepared by compounding the elastomers, fillers and other additives shown in Table 1 in a laboratory Banbury mixer. The mixtures were heated from a temperature of 80° C. up to 160° C. over a period of about 6 minutes, after which the master batch compositions were dumped from the mixer.

Portions of this master batch were then formulated with a curative mixture of sulfur vulcanization accelerators and the other curatives as shown in Table 1A by adding the curative mixture to the rubber stock and milling the mixture on a two roll mill at 50° C. for about 7 minutes.

The curable mixtures were evaluated for vulcanization activity according to ASTM D-2084 using a Monsanto Oscillating Disc Rheometer and then physical properties of the vulcanizates were evaluated by vulcanizing test pads under the various cure conditions set forth in Table 2 using standard ASTM laboratory test practice as follows:

Mooney Viscosity—ASTM D-1646

Mooney Scorch—ASTM D-1646

Tensile Properties—ASTM D-3182 through D-3192

Tensile Properties—ASTM D-412

Ozone Resistance—ASTM D-3395-86 (Method A)
 Covers mixing conditions and curing

Covers tension testing and tensile properties.

TABLE 1

| | Example 1 | | Example 2 | | Example 3 | |
|---|---|---|---|---|---|---|
| | PHR | G. | PHR | G. | PHR | G. |
| SMR | 100 | 710 | 80 | 592 | 70 | 532 |
| EMDX 90-10 | 0 | 0 | 20 | 148 | 30 | 228 |
| CARBON BLACK | 55 | 390.5 | 55 | 409 | 55 | 418 |
| SUNPAR 2280 | 0 | 0 | 5 | 37 | 5 | 38 |
| AROMA 790 | 5 | 35.5 | 0 | 0 | 0 | 0 |
| STEARIC ACID | 2 | 14.2 | 0.5 | 3.7 | 0.5 | 3.8 |
| PARAFFIN WAX | 1.0 | 7.2 | 0 | 0 | 0 | 0 |
| ANTIOXIDANT | 2 | 14.2 | 0 | 0 | 0 | 0 |
| ZnO | 5 | 35.5 | 0 | 0 | 0 | 0 |
| TOTAL | 170 | 1207 | 160.5 | 1167.7 | 160.5 | 1219.8 |

TABLE 1A

| CURATIVES PHR) | Ex. 1 | Ex. 2 | Ex. 3 |
|---|---|---|---|
| ZnO (PHR) | 0 | 2 | 2 |
| CBS (PHR) | 0.7 | 2 | 2 |
| SULFUR (PHR) | 3.5 | 0.5 | 0.5 |
| VULTAC #5 (PHR) | 0 | 1.5 | 1.5 |

Physical property data for the cured formulations is shown in Table 2.

TABLE 2

| Compound No. | | 1 | 2 | 3 |
|---|---|---|---|---|
| Mooney Vis., ML 1 + 4 100° C. | | 24.4 | 39.3 | 44.3 |
| Mooney Scorch 5 pt min | | 20.5 | 9.9 | 8.4 |
| 125° C., ML 35 pt min | | 23.3 | 30.5 | 32.5 |
| Min Reading | | 15.9 | 29.2 | 33.8 |
| Rheometer, Arc +/− 3° | | | | |
| | ML lb. inch | 3.3 | 6.4 | 7.5 |
| | MH lb. inch | 80.7 | 69.5 | 71.4 |
| 160° C. | TS2 m.s | 1.6 | 2.8 | 2.3 |
| | Tc90 m.s | 6.2 | 5.9 | 6.5 |
| | Cure Time Min. | 7 | 6 | 7 |
| Original | Hardness Shore A | 63 | 59 | 62 |
| | 100% Modulus, Kg/cm² | 28 | 23 | 26 |
| Cured | 300% Modulus, Kg/cm² | 134 | 121 | 127 |
| 160° C. | Tensile Strength, Kg/cm² | 235 | 204 | 195 |
| | % Elongation | 490 | 460 | 450 |
| | Tear Strength, Kg/cm | 48 | 43 | 33 |
| | Cure Time Min. | | | |
| | Hardness, Shore A | 78 | 48 | 52 |
| Aged | 100% Modulus, Kg/cm² | — | 13 | 18 |
| 125° C. | 300% Modulus, Kg/cm² | — | — | — |
| 72 hrs. | Tensile Strength, Kg/cm² | 38 | 28 | 37 |
| | % Elongation | <50 | 200 | 190 |
| | Tear Strength, Kg/cm | 12 | 8 | 8 |

| Test Items | 1 | 2 | 3 |
|---|---|---|---|
| Compression Set | | | |
| 100° C. 22 hrs. 25% | 52.4 | 38.6 | 38.3 |
| −20° C. 22 hrs 25% | 16.5 | 62.5 | 51.0 |
| Rebound -Zwick | | | |
| −20° C. | 13.1 | 10.8 | 8.7 |
| 0° C. | 38.5 | 23.3 | 17.1 |
| 30° C. | 65.6 | 49.4 | 43.1 |
| 60° C. | 72.9 | 65.0 | 62.8 |
| Low Temp brittleness Point | | | |
| Calculated Value (°C.) | −58.6 | −61.0 | −60.8 |
| Ozone Test | | | |
| -Static, 40° C. for 24 hours | | | |
| 50 pphm. 20% extension | A-2 | B-5 | NC |
| 100 pphm. 50% extension | C-5 | C-5 | B-5 |
| -Dynamic, 20% ex. | | | |
| 50 pphm. 40° C. for 48 hrs. | B-2 | B-5 | NC |

Dynamic properties of the cured formulations of Examples 1–3 were evaluated at 24° C. after storage at 150° C. over periods of time ranging from 0 to 210 hours. The effect of aging on such properties as elastic spring rate (K'—N/mm), damping coefficient (C—N-Sec/mm) and tangent delta (a measure of damping efficiency) at frequencies of 15, 100 and 200 Hz are shown in Table 3.

The data in Table 3 show a marked decrease in the change of K', C and Tan Delta properties associated with the formulations of Examples 2 and 3 over an aging period of 0 to 210 hours as compared with the Example 1 formulation which contains natural rubber as the sole elastomer. This is indicative of an enhancement of the heat aging properties of the natural rubber and a reduction of the rate of deterioration of the normally good dynamic properties of natural rubber.

TABLE 3

| HOURS AT 150° C. | Hz | AGING EFFECT ON K' EX. | | | AGING EFFECT ON C EX. | | | AGING EFFECT ON TAN, DELTA EX. | | |
|---|---|---|---|---|---|---|---|---|---|---|
| | | 1 | 2 | 3 | 1 | 2 | 3 | 1 | 2 | 3 |
| 0 | 15 | 840 | 730 | 802 | 0.95 | 1.3 | 1.6 | 0.11 | 0.16 | 0.19 |
| 70 | 15 | 953 | 812 | 854 | 1.51 | 1.5 | 1.8 | 0.15 | 0.18 | 0.20 |
| 140 | 15 | 1159 | 964 | 1010 | 2.26 | 2.0 | 2.2 | 0.18 | 0.19 | 0.20 |
| 210 | 15 | 1097 | 964 | 1052 | 2.32 | 2.0 | 2.4 | 0.20 | 0.20 | 0.21 |
| 0 | 100 | 1108 | 1063 | 1210 | 0.17 | 0.36 | 0.52 | 0.10 | 0.21 | 0.27 |
| 70 | 100 | 1315 | 1191 | 1284 | 0.33 | 0.45 | 0.57 | 0.16 | 0.23 | 0.28 |
| 140 | 100 | 1738 | 1466 | 1538 | 0.47 | 0.54 | 0.66 | 0.17 | 0.23 | 0.27 |
| 210 | 100 | 1836 | 1558 | 1744 | 0.50 | 0.56 | 0.71 | 0.17 | 0.22 | 0.26 |
| 0 | 200 | 1223 | 1228 | 1370 | 0.12 | 0.25 | 0.36 | 0.12 | 0.26 | 0.33 |

TABLE 3-continued

| HOURS AT 150° C. | Hz | AGING EFFECT ON K' EX. | | | AGING EFFECT ON C EX. | | | AGING EFFECT ON TAN, DELTA EX. | | |
|---|---|---|---|---|---|---|---|---|---|---|
| | | 1 | 2 | 3 | 1 | 2 | 3 | 1 | 2 | 3 |
| 70 | 200 | 1423 | 1361 | 1488 | 0.21 | 0.31 | 0.41 | 0.18 | 0.29 | 0.34 |
| 140 | 200 | 1865 | 1635 | 1737 | 0.28 | 0.36 | 0.44 | 0.19 | 0.27 | 0.32 |
| 210 | 200 | 2002 | 1745 | 1983 | 0.32 | 0.37 | 0.48 | 0.20 | 0.27 | 0.30 |

We claim:

1. In a mechanical device comprising a dynamic means which generates heat and/or vibrations and a static structure which supports said dynamic means and which is connected to said dynamic means and having a vulcanized rubber part interposed between said dynamic means and said static structure at said point of connection, the improvement comprising the utilization as said rubber part a shaped vulcanized composition comprising a mixture of:

a) an elastomeric olefin polymer or copolymer,
   b) an elastomeric, halogen-containing copolymer of a $C_4$ to $C_7$ isomonoolefin and a para-alkyl styrene, said halogen-containing copolymer comprising from about 10 to 35 wt % of the elastomer content of the mixture;
   c) a particulate filler, and
   d) a curing system for said composition.

2. The device of claim 1 wherein the olefin polymer is a diolefin copolymer.

3. The device of claim 1 wherein the olefin polymer is a diolefin polymer.

4. The device of claim 1 wherein said halogen-containing copolymer is a brominated copolymer of isobutylene containing up to about 20 wt % of para-methylstyrene.

5. The device of claim 3 wherein said diolefin polymer is natural rubber.

6. The device of claim 1 wherein said dynamic means is an automotive engine, said static structure is an automotive frame and said rubber part is a motor mount.

7. The device of claim 1 wherein said composition also contains a plasticizer oil.

8. The device of claim 1 wherein said particulate filler is carbon black.

9. The device of claim 5 wherein said diolefin polymer is natural rubber and wherein said halogenated copolymer comprises from about 15 to 30 wt % of the elastomer content of the mixture.

10. A motor or engine mount comprising a mixture of:

a) an elastomeric olefin polymer or copolymer,
    b) an elastomeric, halogen-containing copolymer of a $C_4$ to $C_7$ isomonoolefin and a para-alkyl styrene, said halogen-containing copolymer comprising from about 10 to 35 wt % of the elastomer content of the mixture;
    c) a particulate filler, and
    d) a curing system for said composition.

11. The mount of claim 10 wherein said mount is solid.

12. The mount of claim 10 wherein said mount is fluid containing.

13. The mount of claim 10 wherein said mount is foamed.

* * * * *